United States Patent
Kühne et al.

[11] Patent Number: 6,139,215
[45] Date of Patent: Oct. 31, 2000

[54] DISC-HUB CONNECTION, IN PARTICULAR FOR UTILITY VEHICLE DISC BRAKES

[75] Inventors: Victor Kühne, Nördlingen; Dieter Bieker, Oberaudorf, both of Germany

[73] Assignee: Knorr-Bremse System fuer Nutzfahrzeuge GmbH, Germany

[21] Appl. No.: 09/077,245
[22] PCT Filed: Nov. 12, 1996
[86] PCT No.: PCT/EP96/04948
§ 371 Date: May 21, 1998
§ 102(e) Date: May 21, 1998
[87] PCT Pub. No.: WO97/20151
PCT Pub. Date: Jun. 5, 1997

[30] Foreign Application Priority Data

Nov. 30, 1995 [DE] Germany .................. 195 44 559

[51] Int. Cl.⁷ .................................. F16D 65/12
[52] U.S. Cl. .................. 403/337; 403/370; 403/336; 188/206 R; 188/18 A
[58] Field of Search ................... 403/337, 336, 403/367, 368, 370, 374.3, 28, 29, 30; 188/218 A, 218 R, 218 XL, 206 R, 18 A

[56] References Cited

U.S. PATENT DOCUMENTS

| | | | |
|---|---|---|---|
| 3,776,651 | 12/1973 | Peter et al. | 403/370 X |
| 3,989,126 | 11/1976 | Katzer | 188/206 R |
| 4,022,536 | 5/1977 | Piepho et al. | 403/370 X |
| 4,152,099 | 5/1979 | Bingler | 403/368 X |
| 5,190,124 | 3/1993 | Haneda | 188/18 A X |
| 5,273,140 | 12/1993 | Berwanger . | |
| 5,884,980 | 3/1999 | Visser et al. | 188/218 XL |
| 5,890,567 | 4/1999 | Pete et al. | 188/218 R |
| 5,899,305 | 5/1999 | Austin et al. | 188/218 XL |
| 5,918,707 | 7/1999 | Saunders, III | 188/18 A |

FOREIGN PATENT DOCUMENTS

| | | |
|---|---|---|
| 062 774 | 10/1982 | European Pat. Off. . |
| 0 065 312 | 11/1982 | European Pat. Off. . |
| 127 932 | 12/1984 | European Pat. Off. . |
| 235 382 | 9/1987 | European Pat. Off. . |
| 474 877 A1 | 3/1992 | European Pat. Off. . |
| 589 408A1 | 3/1994 | European Pat. Off. . |
| 34 36 729A | 4/1986 | Germany . |
| 2 228 053 | 8/1990 | United Kingdom . |

*Primary Examiner*—Lynne H. Browne
*Assistant Examiner*—John R. Cottingham
*Attorney, Agent, or Firm*—Barnes & Thornburg

[57] ABSTRACT

The invention concerns a disc-hub connection for connecting a brake disc to a hub, in particular for utility vehicle disc brakes. In its inner peripheral region the brake disc comprises support elements, the hub comprising cams in its outer peripheral region. Intermediate elements are used to transfer torque from the cams of the hub to the support elements of the disc, the cams of the hub engaging in the intermediate elements and the latter engaging in the support elements.

18 Claims, 5 Drawing Sheets

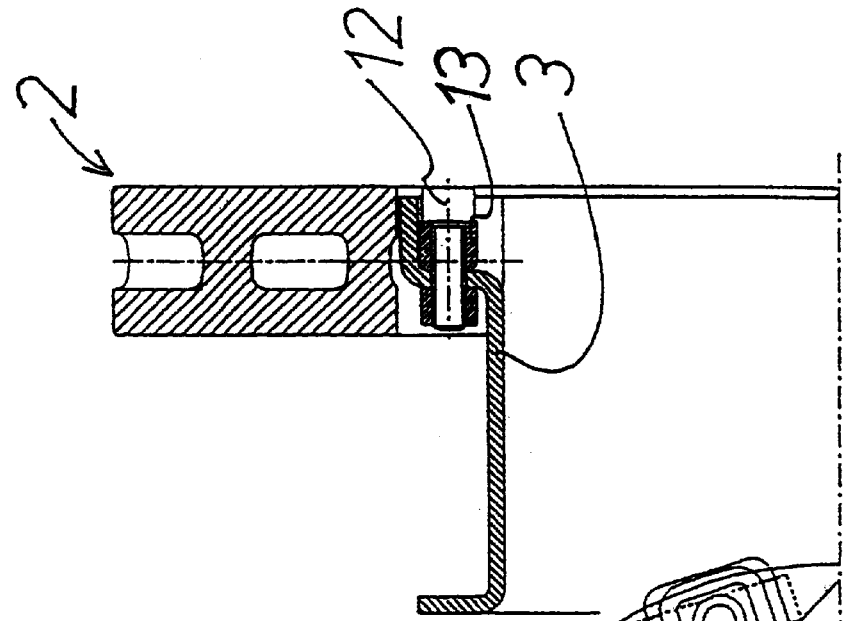
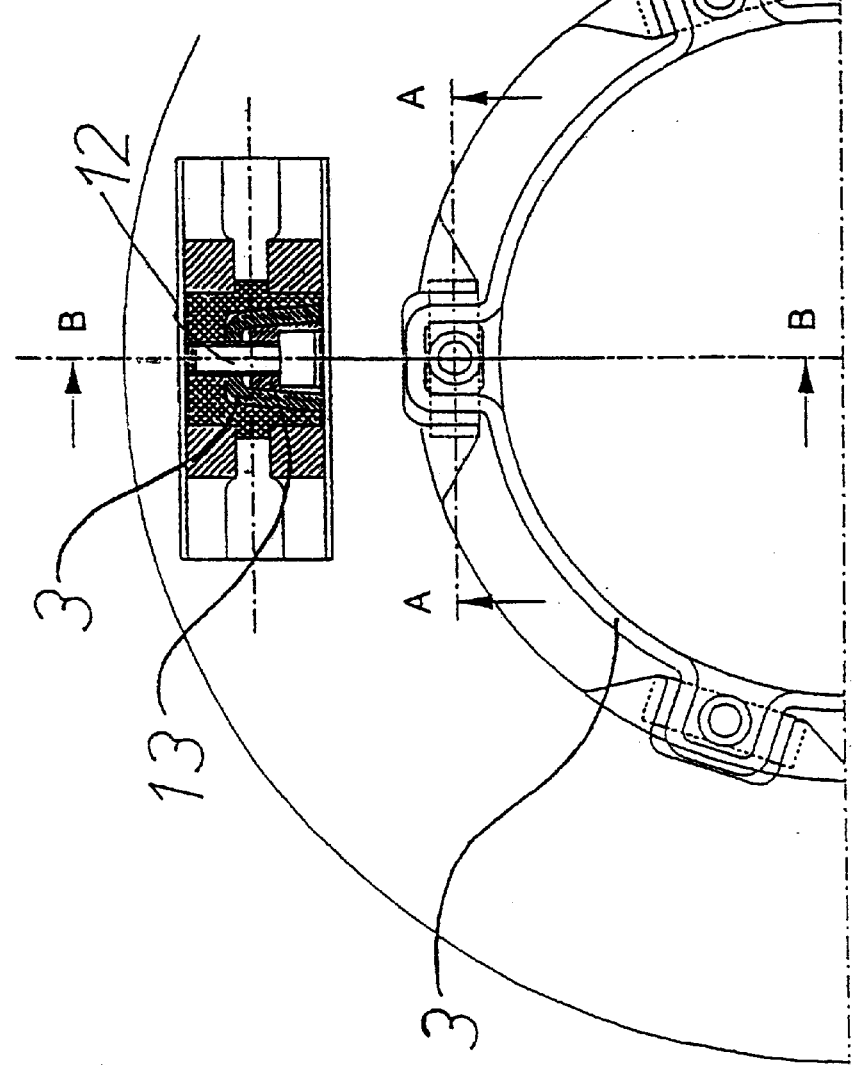

DISC-HUB CONNECTION, IN PARTICULAR FOR UTILITY VEHICLE DISC BRAKES

BACKGROUND AND SUMMARY OF THE INVENTION

The invention relates generally to a disk-hub connection and more specifically to disc-hub connectors for utility vehicle disc brakes.

According to the state of the art, disk-hub connections for disk brakes of motor vehicles are constructed either in one piece—that is, the disk and the hub set consist, for example, of one casting—or—see, for example, German Patent Document DE 34 41 304 concerning the above-mentioned type—of two pieces. Because of expansion and crack problems as the result of an intensive heating of the disks during the braking, the one-piece constructions are mainly suitable for lighter motor vehicles. With an increasing trend to use disk brakes also in heavy utility vehicles, the demand exists for a disk construction which can also securely withstand the high stresses occurring during a braking of heavy utility vehicles. Because of a lower tendency to form cracks, the two-piece variant has recently been favored. First attempts to adapt the technology shown in German Patent Document DE 34 41 304 (having the problem of poor ventilation and cooling) to the utility vehicle field are known, for example, from Patent Document WO93/14947. However, the disk shown there can be implemented with respect to manufacturing techniques only at relatively high cost.

In addition to the high requirements concerning the stability with respect to cracks, it is necessary in the case of disk-hub connections for utility vehicles to get by with the scarce available space. In the ideal case, a two-piece construction should not require more installation space than the corresponding one-piece variant.

From German Patent Document DE 34 36 729, as the closest state of the art, a disk-hub connection is known for connecting a brake disk with a hub, particularly for cranes of different types, whose brake disk is provided in the inner peripheral region with semicircular bores or recesses so that "support elements" are formed between the bores which project radially to the inside. On its outer periphery, the hub is also provided with semicircular recesses so that the hub has "cams" on it outer peripheral region which project radially to the outside. In this case, intermediate elements are used for the torque transmission between the hub and the disk as follows: When the hub and the disk are assembled (for example, by shrinking the disk onto the hub), the semicircular recesses of the hub and the disk are in each case situated opposite one another so that circular recesses are formed between the hub and the disk. Sleeves are inserted into these recesses, which sleeves are axially secured by screws and washers. Although it is possible in this manner to partly eliminate excessive strains result from temperature differences between the hub and the disk, the mounting of the disk remains relatively complicated. The solution is also hardly suitable for transmitting the high braking forces occurring in the case of faster utility vehicles.

In contrast to this state of the art, it is an object of the invention to provide a hub-disk connection which ensures a secure force transmission between the hub and the disk and can easily be mounted also in a narrow installation space.

The invention achieves this goal by a disk-hub connection in the case of which the torque transmission between the disk and the hub during braking from a forward drive and a reverse drive is always fully ensured. In the case of which, because of the uncoupling of the disk and the hub, crack formations caused by the heating of the disk during the braking operation are safely prevented. Furthermore, a disk-hub connection is implemented at reasonable cost whose components can be produced also without high-precision manufacturing tolerances and which can be assembled in an easy and rapid fashion. Another advantage of the invention is the fact that it does not increase the installation measurements of the disk-hub complex in comparison to a one-piece variant.

The use of additional elements between the disk and the hub, which also contribute to the torque transmission between the brake disk and the brake hub, is basically known (for example, from German Patent Document DE-OS 38 14 614 concerning rail vehicle technology), in the field of rail vehicle technology. But of the clearly lower frictional connection between the wheel and the rail, the braking torques are much lower than in the utility vehicle field. Thus, in the case of a multi-part construction of the hub and the disk, the bolts connecting the disk and the hub can also contribute to the transmission of the torque. For this reason, among others, only three intermediate sliding block elements are used in the case of the brake disk of German Patent Document DE OS 38 14 614. In contrast, because of the engagement of the cams of the hub in the intermediate element, the present invention makes it possible to also transmit larger torques securely and without the danger of breakage. The intermediate element implements a form closure and frictional connection which permits an unlimited secure transmission of the forces and torques between the disk and the hub which occur during the braking operations.

A preferred variant of the invention is characterized in that the intermediate elements engage in the supporting elements and are supported in the peripheral direction in a form-locking manner on the support elements. The variant of the invention implemented in this fashion further optimizes the torque transmission from the hub to the disk while simultaneously minimizing the required installation space because the cams, the intermediate elements and the wheel hub projection each engage in one another in a particularly space-saving manner.

In the case of another, particularly preferred embodiment of the invention, the intermediate elements have lateral projections which are supported in the axial direction on the support elements. In addition to taking over the task of the torque transmission in the radial direction, the support elements therefore advantageously also take over the required axial fixing of the disk on the hub.

Another advantage of the invention is the result of the fact that, because of the intermediate piece, it is possible to design the support surfaces such that the hub and the disk can be manufactured of different materials, which leads to further savings of weight and cost.

In the following, the invention will be described in detail with reference to the drawing. Other objects, advantages and novel features of the present invention will become apparent from the following detailed description of the invention when considered in conjunction with the accompanying drawings.

BRIEF DESCRIPTION OF THE DRAWINGS

FIGS. 6a–c are a top view and sectional views of another embodiment of the invention.

First, the embodiment of FIG. 1 will be described.

DETAILED DESCRIPTION OF THE PREFERRED EMBODIMENTS

Figures 1, 2:
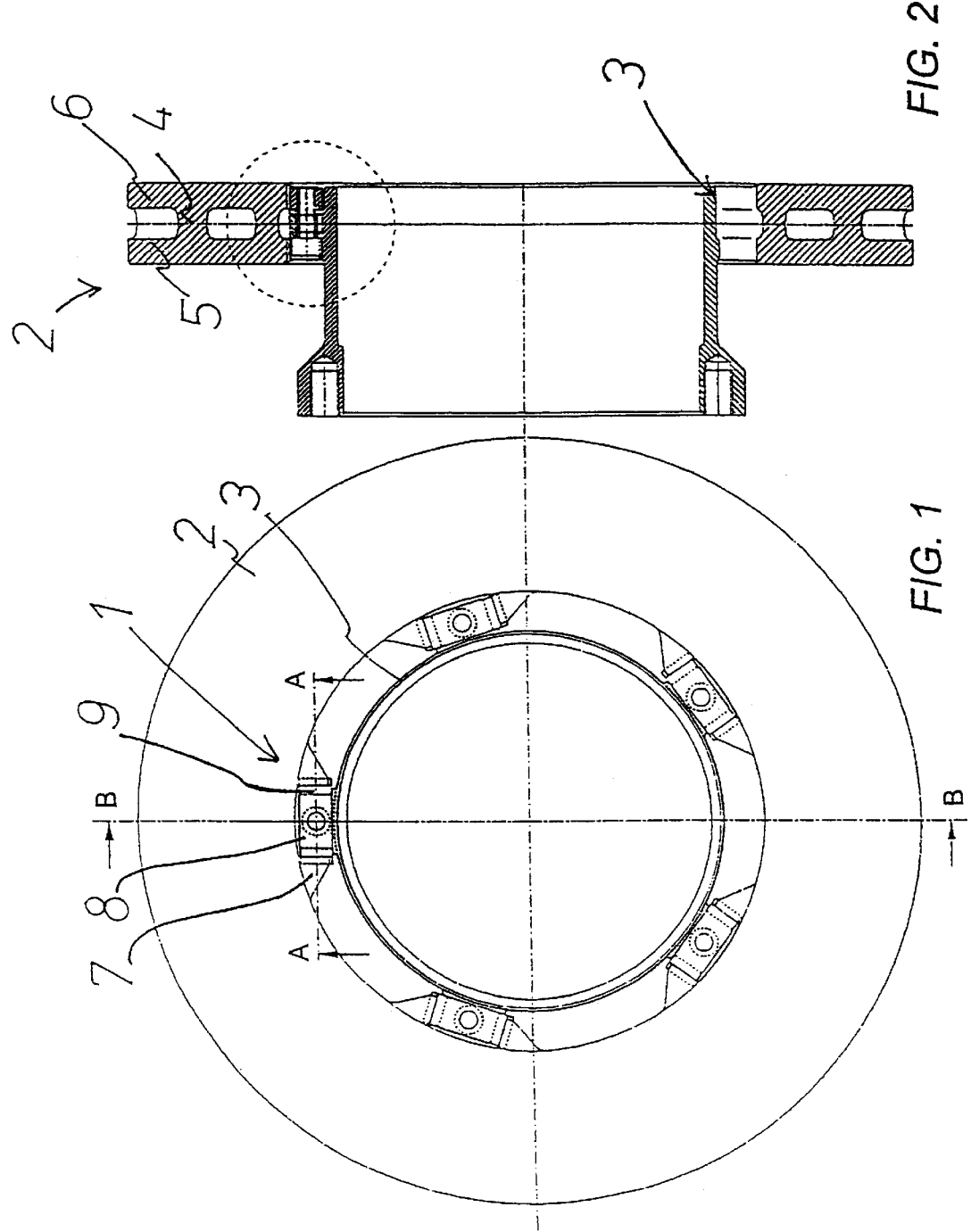
FIG. 1 is a top view of a disk-hub connection according to the invention.
FIG. 2 is a sectional view along Line B—B from FIG. 1.
Figure 3:
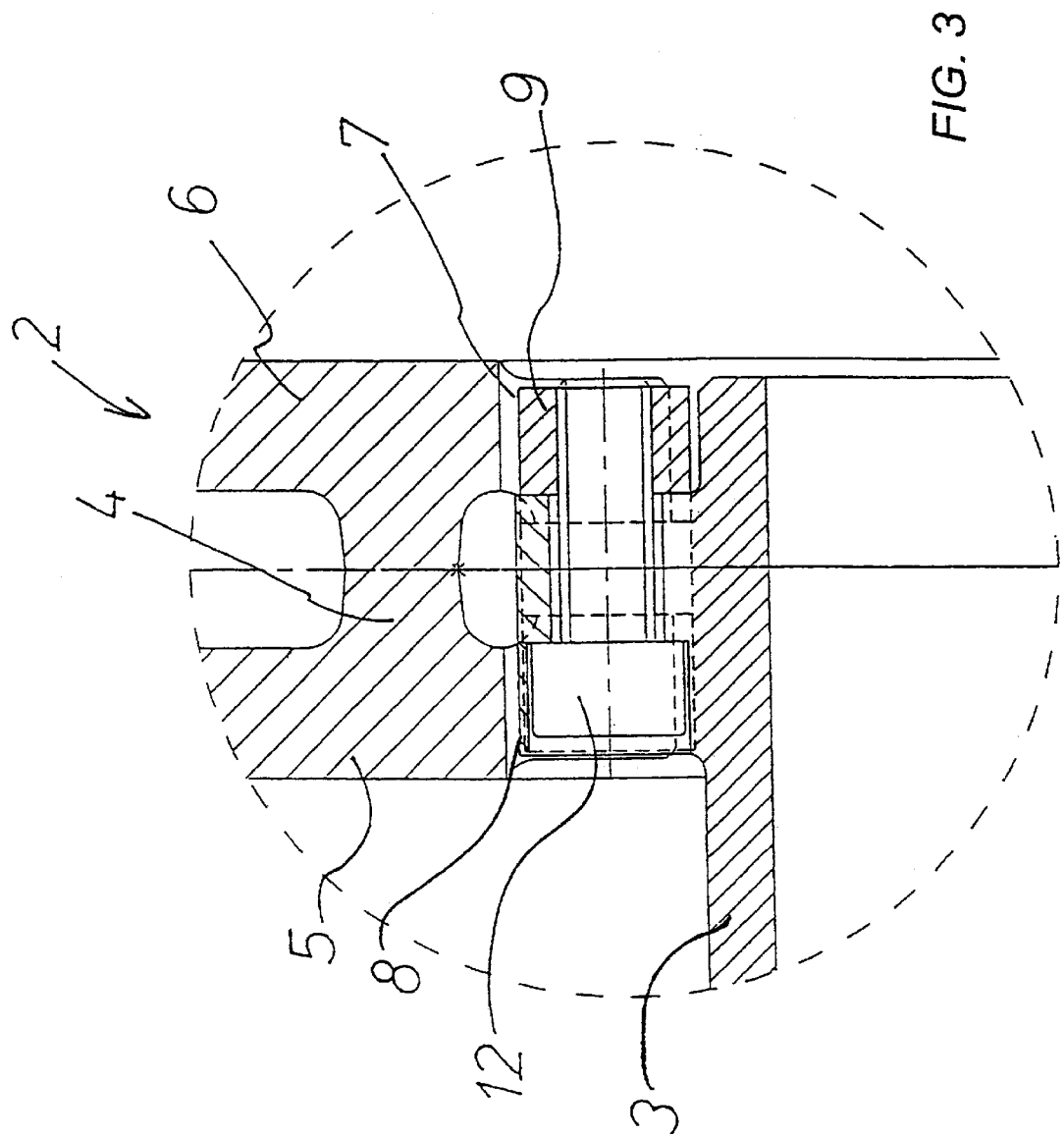
FIG. 3 is an enlargement of a cut-out of FIG. 2.

FIG. 1 illustrates a disk-hub connection 1 according to the invention for connecting a brake disk 2 with a hub 3 for a (not shown) utility vehicle disk brake.

Figure 4:
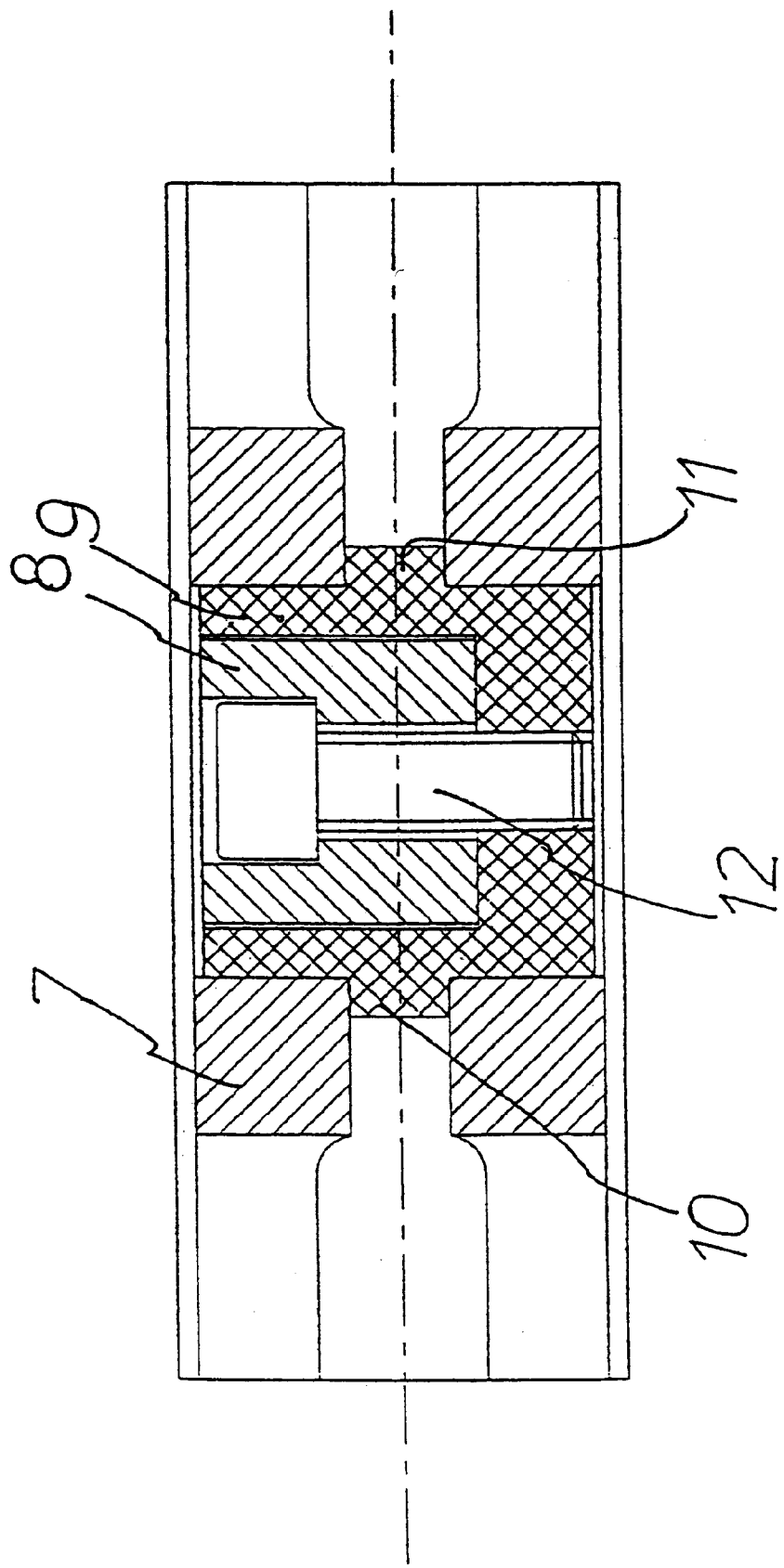
FIG. 4 is a sectional view along Line A—A from FIG. 1.

As illustrated in FIG. 2, the brake disk 2 has two friction surfaces 5, 6 which are connected with one another by webs 4. As shown in FIGS. 1 and 4, pairs of support elements 7 are molded to the friction surfaces 5, 6 in the interior peripheral region in each case toward the inside.

The disk hub 3 (here, a cylindrical tube-shaped section on whose one end the disk 2 is placed and whose other end can be screwed on the actual wheel hub) is provided with cams 8 on its outer periphery. The cams each project radially to the outside. The cams 8 engage in intermediate or force transmitting elements 9. The intermediate elements 9, turn, are supported in both peripheral directions in a form-locking manner on one pair of support elements 7 respectively. This ensures, in both rotating directions, a secure torque transmission from the disk 2 by way of the intermediate element 9 to the hub 3. In particular, the torque transmission is ensured during braking operations from the forward drive as well as in the case of braking operations from the reverse drive. On their sides facing the cams 8, the lateral surfaces of the support elements 7 are aligned in parallel to the radial line of the disk, while the exterior sides of the support elements 7 facing away from the cams 8 for increasing the protection against breakage, extend in a very sloped manner with respect to the radial line. In the embodiment of FIG. 1, a total of five double pairs of support elements 7 and five of the cams 8 are provided, which are each arranged to be offset with respect to one another by 72°.

For the axial securing, lateral projections 10, 11 are molded to the intermediate elements 9 and reach in the peripheral direction between the support elements 7 of the friction surfaces 5, 6 which each belong together in pairs. Thus, the securing of the connection between the hub 3 and the disk 2 is also clearly improved in the two axial direction with respect to the state of the art.

During the mounting, the intermediate elements 7 are first slid from the inside radially toward the outside into the disk 2. The disk 2, which is prepared in this manner, is then placed laterally or axially on the hub 3 so that the cams 8 of the hub 3 reach into the intermediate elements 9. For the axial fixing, the cams 8 and the essentially U-shaped intermediate elements 9 are each connected with one another by way of a stud or fastener 12. As the result, the support elements 7 are displaceable only in the radial direction toward to the outside relative to the intermediate elements 9. In which case, the support areas between the support element 7 and the intermediate element 9 have a surface-shaped construction. The intermediate elements 9 correspondingly have support surfaces in their interior area, on which support surfaces the cams 8 of the hub 3 are supported in the peripheral direction. Because of the radial displaceability of the intermediate elements 9 with respect to the disk 2, crack formations of the disk 2 are safely prevented.

The intermediate elements 9 are preferably manufactured from a high-strength material having a low thermal conductivity (such as a ceramic material or a lower-heat-conducting steel). Because of their simple construction, it is even possible to construct the intermediate elements 9 such that they can be manufactured as a section of a bar.

Figure 5:
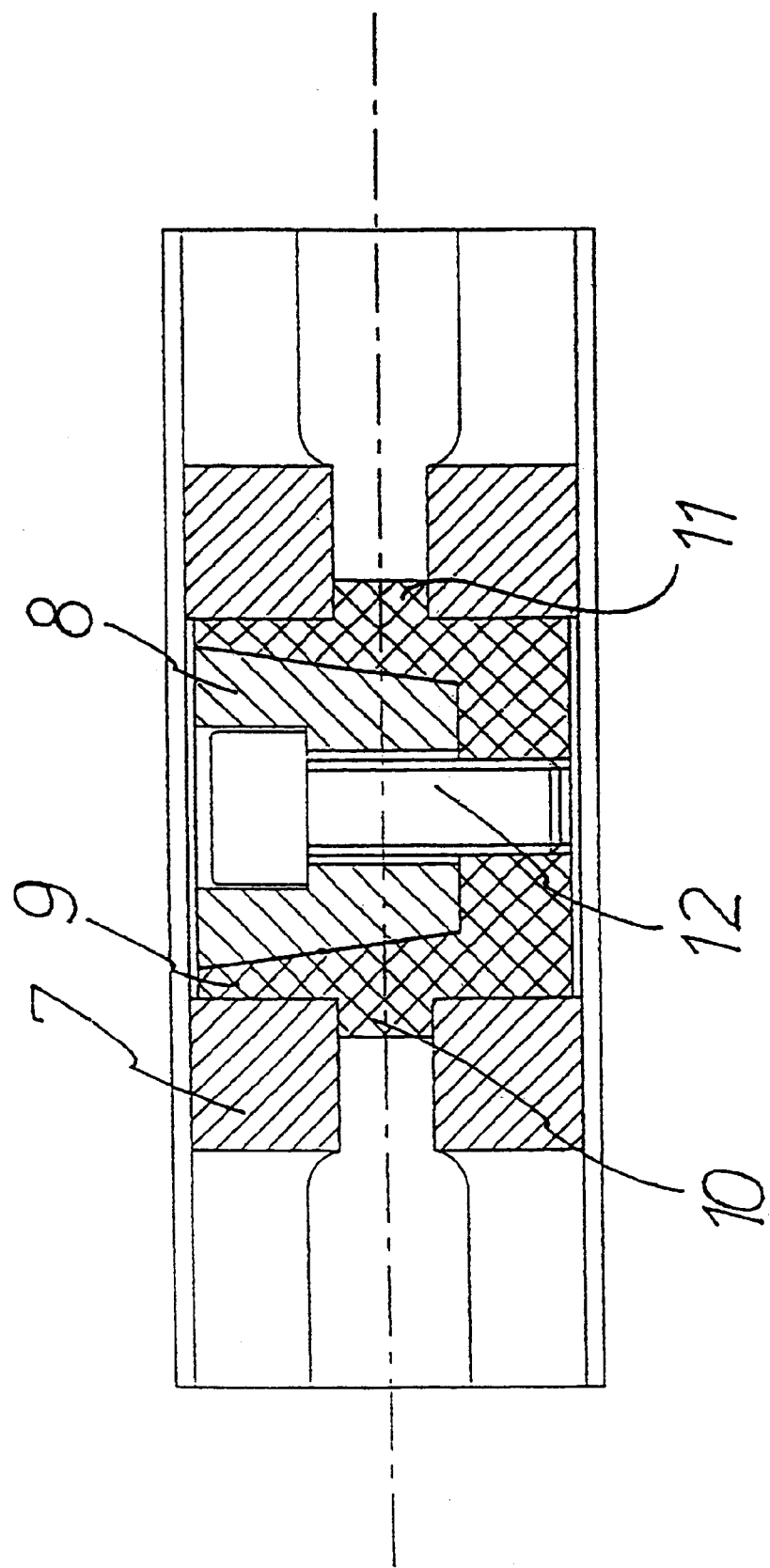
FIG. 5 is a sectional view of another embodiment of the invention corresponding to FIG. 4.

In another embodiment of the invention—illustrated in FIG. 5—, the support surfaces of the intermediate element 9 have a conical construction, which securely ensures a demounting even after a long operation under rough conditions.

FIG. 6 shows another embodiment of the invention in which the hub is constructed as a reasonable-cost deep-drawn part. This exhibits another important advantage of the invention wherein the disk 2 and the hub 3 may not—as otherwise customary—be manufactured of gray cast iron but of different materials. This is possible, among other things, because the non-elastic intermediate element (which is manufactured, for example, of high-strength steel) makes it possible to design the surfaces required for the force transmission to be from a lower-value material (for example, of the hub) to a higher-value material (in this case, of the disk). For connecting the hub 3 and the stud 12 as well as optionally also for the additional supporting of the hub 3, in the case of the embodiment of FIGS. 6a–c, an additional insertion piece 13 is inserted into the hub 3. Advantages of the construction as a deep-drawn hub are further savings of cost and weight in comparison to a cast hub.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A disk-hub connection for connecting a brake disk with a hub, comprising:

a) a hub, b) a brake disk having an outer circumference and an inner circumference generally concentric with the outer circumference, c) the brake disk provided with support elements which project radially inward from the inner circumference, d) the hub provided with cams in an outer peripheral region which project radially outward and radially aligned with the support elements on the brake disk, and e) intermediate elements drivingly connected to the support elements and engagingly receiving the cams of the hub for transmission of torque and force from the cams of the hub directly to the support elements of the disk.

2. A disk-hub connection according to claim 1, wherein the intermediate elements engage in and are supported by the support elements and are locked from movement in a peripheral direction.

3. A disk-hub connection according to claim 2, wherein the cams are connected with the intermediate elements in a form-locking and/or frictional connection.

4. A disk-hub connection according to claim 1, wherein the intermediate elements have lateral projections which are supported in the axial direction on the support elements.

5. A disk-hub connection according to claim 1 wherein the support element can be displaced in the radial direction relative to the intermediate elements.

6. A disk-hub connection according to claim 1, wherein the intermediate elements have an essentially U-shaped design.

7. A disk-hub connection according to claim 1 wherein the intermediate elements are further developed such that they can be inserted in the radial direction from the inside toward the outside in the inner peripheral region of the disk.

8. A disk-hub connection according to claim 1 wherein the support elements are arranged in pairs and reach around the intermediate elements in the peripheral direction.

9. A disk-hub connection according to claim 1 wherein the support regions between the support elements and the intermediate elements have an essentially surface-shaped construction.

10. A disk-hub connection according to claim 1 wherein the intermediate elements in an interior area have support surfaces on which the cams of the hub are supported in the peripheral direction.

11. A disk-hub connection according to claim 1 wherein the support elements form double pairs, one pair in the peripheral direction and one pair in the axial direction, which reach around the intermediate elements in both axial directions as well as in both peripheral directions.

12. A disk-hub connection according to claim 1 wherein the support surfaces of the intermediate elements extend conically.

13. A disk-hub connection according to claim 1 wherein the intermediate element consists of a ceramic material of low thermal conductivity.

14. A disk-hub connection according to claim 1 wherein the intermediate elements consist of a high-strength steel material.

15. A disk-hub connection according to claim 1 wherein the intermediate elements are sections of a bar.

16. A disk-hub connection according to claim 1 wherein the hub and the disk consist of different materials.

17. A disk-hub connection according to claim 1 wherein the hub is constructed as a deep-drawn part.

18. A disk-hub connection according to claim 1, wherein the cams are connected with the intermediate elements in a form-locking and/or frictional connection.

* * * * *